United States Patent
Morrell et al.

(10) Patent No.: US 10,243,733 B2
(45) Date of Patent: Mar. 26, 2019

(54) PROCESS AND SYSTEM FOR ESTABLISHING A MOVING TARGET CONNECTION FOR SECURE COMMUNICATIONS IN CLIENT/SERVER SYSTEMS

(71) Applicants: Christopher F. Morrell, Radford, VA (US); Reese A. Moore, San Diego, CA (US); Joseph G. Tront, Blacksburg, VA (US); Randolph C. Marchany, Blacksburg, VA (US)

(72) Inventors: Christopher F. Morrell, Radford, VA (US); Reese A. Moore, San Diego, CA (US); Joseph G. Tront, Blacksburg, VA (US); Randolph C. Marchany, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 182 days.

(21) Appl. No.: 15/460,935

(22) Filed: Mar. 16, 2017

(65) Prior Publication Data
US 2017/0272242 A1    Sep. 21, 2017

Related U.S. Application Data

(60) Provisional application No. 62/309,612, filed on Mar. 17, 2016.

(51) Int. Cl.
*H04L 9/08* (2006.01)
*H04L 9/32* (2006.01)
*H04L 9/30* (2006.01)
*H04L 9/16* (2006.01)
*H04L 9/14* (2006.01)

(52) U.S. Cl.
CPC .......... *H04L 9/0841* (2013.01); *H04L 9/0869* (2013.01); *H04L 9/14* (2013.01); *H04L 9/16* (2013.01); *H04L 9/3066* (2013.01); *H04L 9/3242* (2013.01)

(58) Field of Classification Search
CPC ... H04L 9/3242; H04L 9/0869; H04L 9/0841; H04L 9/30; H04L 9/0643
See application file for complete search history.

(56) References Cited

U.S. PATENT DOCUMENTS

| | | | | |
|---|---|---|---|---|
| 9,264,425 | B1 * | 2/2016 | Chen | H04L 63/083 |
| 2007/0106892 | A1 * | 5/2007 | Engberg | G06Q 20/02 713/168 |
| 2013/0212249 | A1 * | 8/2013 | Groat | H04L 9/16 709/223 |
| 2015/0358158 | A1 * | 12/2015 | Fadaie | H04L 9/0838 713/171 |

* cited by examiner

*Primary Examiner* — Dao Q Ho
*Assistant Examiner* — Bassam A Noaman
(74) *Attorney, Agent, or Firm* — W&C IP

(57) ABSTRACT

A system and method performs a moving target blind rendezvous by exchanging data through a distributed hash table. The system allows users to securely send small pieces of information over a network while only requiring an exchange of public keys ahead of time. The system relies on the size and resilience of the BitTorrent Distributed Hash Table and the security properties of cryptographic constructions such as Elliptic Curve Diffie-Hellman key exchange and secure one-way hash functions.

12 Claims, 6 Drawing Sheets

PROCESS AND SYSTEM FOR ESTABLISHING A MOVING TARGET CONNECTION FOR SECURE COMMUNICATIONS IN CLIENT/SERVER SYSTEMS

BACKGROUND OF THE INVENTION

Field of the Invention

The present invention generally relates to network based communications and, more particularly, to a system and method for dynamically establishing a moving target connection by sharing only publically available information. The invention allows secure communications between many clients and a server using moving target Internet Protocol version 6 (IPv6) defense (MT6D). The invention is referred to as a Client/Server Moving Target IPv6 Defense (CSMT6D).

Background Description

Network-based moving target defense is a computer security technique by which devices on a network are permitted to change some properties of the network periodically, thus decreasing the likelihood of targeting by an adversary. In particular, moving target systems modify the IP address of a host. The primary limitation of most network based moving target solutions is that they rely on statically defined pre-shared information in order to establish connections. This pre-sharing does not scale when attempting to apply a moving target defense to a server that is providing services to a large number of clients. Scaling introduces problems of logistics and security. Logistically, it is extremely challenging to distribute and configure static information on a large number of systems that are distributed across the Internet without compromising the anonymity and security benefits of a moving target defense. Scaling a statically configured moving target defense is also vulnerable to information leakage, since the attack surface grows as more machines contain the pre-shared information.

Moving Target IPv6 Defense (MT6D) is a specific implementation of a network layer moving target defense that was introduced by researchers at Virginia Tech. MT6D is a proof of concept implementation that allows two nodes to utilize a network layer moving target defense while continuing to maintain open Transport Control Protocol (TCP) sessions. Two limitations of the original implementation of MT6D are that the researchers focused solely on peer-to-peer networks and provided no means to dynamically exchange required session establishment configuration data.

SUMMARY OF THE INVENTION

It is therefore an object of the present invention to provide modifications to MT6D that overcome these shortcomings in order to provide support for the more commonly occurring client/server network connections; e.g., CSMT6D.

More particularly, the present invention overcomes many of the issues present in the original design of MT6D by using a Distributed Hash Table (DHT) as a means to conduct a blind rendezvous, which allows the secure exchange of MT6D configuration data. Primarily the invention presents modifications to the MT6D scheme which allow a single server to provide services to some large number of clients. In its preferred embodiment, the invention is a system and method that leverages the size and distributed nature of the BitTorrent Distributed Hash Table (DHT) in combination with a private/public key-pair in order to securely distribute moving target defense configuration information.

The implementation of this MT6D server, and its ability to exchange configurations securely and dynamically, provides additional protections that the original implementation of MT6D failed to provide. The movement from statically to dynamically generated configurations ensures that the risk of compromised passwords and replay attacks are removed as issues. Additionally, the ability to distribute configuration files through the DHT eliminates the risk of storing static configurations locally and provides the capability to distribute to a much larger audience without the logistical overhead of manual configurations. Finally, the added dynamism presented in this paper provides a capability that could be leveraged to enable moving target defense configuration changes as the security level of the network fluctuates.

According to another aspect of the invention, there is provided a system and method that uses cryptographically strong algorithms to generate a location in the DHT that can be calculated by two peers using their private and their peer's public keys. One of the peers publishes a signed and encrypted message at that location which includes the information required to establish a moving target defense connection. After retrieving the message, the second peer now has the ability to establish an introduction moving target session, which will be followed by an addition exchange of configuration information before moving into a communication session.

In addition, the invention enables a moving target defense peer to maintain a large number of sessions with different peers. In this case, a first peer is referred to as a server and the others as clients. The Internet today is made up primarily of client-server relationships, including web and email servers. By applying the technology of this invention, a server is permitted to maintain a distinct moving target connection with up to 15,000 clients in simulations concurrently while continuing to move itself logically around the network and avoiding detection from potential adversaries.

The combination of methods introduced by the invention provides the ability to serve a large number of clients while improving the security of the connections with clients and allowing privacy to be maintained. The system and methods according to the invention overcomes both the logistical and security based limitations of traditional moving target defense session establishment schemes. Additionally, the invention allows dynamic reconfiguration of our moving target sessions, which could be triggered, based on some suspected malicious activity on the network. This improves the privacy and security of the session by permitting flexibility where none existed before.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION THE INVENTION

To combat the increasing threat to network security and privacy, the Information Technology (IT) Security Lab and the Bradley Department of Electrical and Computer Engineering at Virginia Tech have developed the Moving Target IPv6 Defense (MT6D) which uses a new form of dynamic addressing in IPv6 to secure and anonymize network hosts and their communications. Exploiting the large address space in IPv6, MT6D rotates network and trasport layer addresses mid-session to prevent hosts from being targeted for network attacks and from having their movements and communications observed.

Figure 1:
FIG. 1 is an illustration of a network of two hosts using MT6D.
Figure 2:
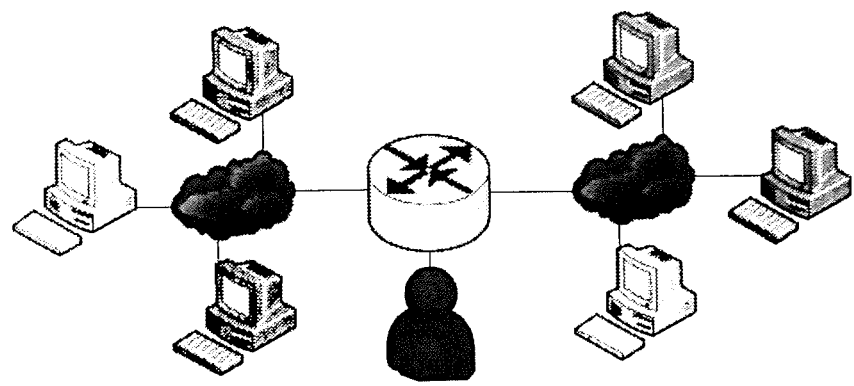
FIG. 2 is an illustration of a network showing an attacker's view of two hosts using MT6D.

Static addresses are easy targets for address tracking and network attacks. IPv6 compounds this vulnerability because of the way addresses are formed. MT6D prevents attackers from targeting specific addressees by dynamically rotating host addresses without impacting preexisting sessions. FIG. 1 illustrates a network of two hosts using MT6D. The dynamic addresses are not linked to hosts' identities, requiring attackers to scan the subnet for targets. FIG. 2 illustrates an attacker's view of two hosts using MT6D. The communicating hosts appear and disappear on seemingly random addresses. MT6D leverages the immense address space of IPv6 to provide an environment so large that an efficient search is infeasible. In the unlikely event that attackers locate a target, the damage they can inflict is limited to the interval between address rotations, and reacquiring the target is infeasible. The moving target defense forces attackers to use resources not only to attack and to penetrate targets, but also to constantly find and attempt to require them.

IPv6 stateless address autoconfiguration (SLAAC) is an automatic addressing scheme that was formalized in RFC 2462 and updated in RFC 4862 that provides a machine with the ability to generate its own an IPv6 address. Hosts are permitted to generate their own IIDs by using the Extended Unique Identifier-64 (EUI-64) format. EUI-64 functions by splitting the 48-bit Media Access Control (MAC) address in half and inserting a 16-bit hex value of 0xffee between the halves of the MAC address. The host also sets bit 7 of the IID, which is the universal/local flag, to 1. In order to use a correct routing prefix and subnet id for their given network, the host must request this information from their local router by using Neighbor Discover Protocol (NDP).

NDP is the IPv6 replacement for IPv4's Address Resolution Protocol (ARP). It consists of five messages that are used by routers and hosts in order to determine which other hosts are on the network around them. In SLAAC, a host sends a router solicitation message onto the network. The router will hear this request and respond with a router advertisement message which contains the first 64-bits of the IPv6 address that the host will use.

The host now concatenates the router provided network information with the EUI-64 generated IID resulting in a unique 128-bit IPv6 address. Since most machines on the Internet use this same method each time they generate an address, it is likely that the IID will be the same for a given interface on a machine. It is also worth remembering that bits 7 and 25-40 of the IID will always be the same for every SLAAC generated address in a subnet.

Moving Target IPv6 Defense (MT6D) was originally proposed by Dunlop et al. as a specific solution to the network based moving target defense problem (see, M. Dunlop, S. Groat, W. Urbanski, R. Marchany, and J. Tout, "MT6D a moving target IPv6 defense," *Military Communications Conference*. 2011-*MILCOM* 2011, 2011, pp. 1321-1326). MT6D provides security and anonymity on the network by leveraging the enormity of the IPv6 address space. Hosts assign themselves new IPv6 addresses at arbitrary but pre-determine time intervals and MT6D allows them to maintain the ability to communicate with each other. The large number of addresses available within the IPv6 address space gives an almost zero probability that a pair of randomly selected IPv6 addresses will collide.

The addresses selected for use are generated through the application of the MT6D algorithm, which uses the machines's stateless address autoconfiguration (SLAAC) generated or statically assigned IPv6 address, a passphrase, and the current time as inputs. Machines also require the seed IPv6 address of the host that they will be communicating with via the MT6D connections. With all of the address generation information available to both hosts, machines are able to calculate not only their own MT6D addresses, but also the MT6D addresses of pairs of peers. Peers periodically rotate addresses based on a current time window. MT6D then encapsulates the original IP packet inside of the user datagram protocol (UDP) datagram sent on the rotating address, allowing transmission control protocol (TCP) sessions to remain active while addresses are changed.

The MT6D IID is generated by using a cryptographically secure one-way function such as SHA256 to hash the base IID, a shared secret key, and the time slot. After hashing, only the first 64 bits of the digest are used. The MT6D address for the time slot is then calculated by concatenating the machine's original IPv6 subnet information and the newly calculated IID. The original subnet must stay intact so that packets can be routed to the correct network. Nodes must use the scheme in order to calculate addresses for both themselves and a pre-coordinated peer node. Calculating the address for a peer node ensures that MT6D packets can be addressed with ever-changing IIDs. All configuration information is pre-configured statically and each node must know their peer's IID, the shared secret key, and be using some means to ensure synchronized time.

One of the essential components of a distributed system is the ability to establish a secure connection through the use of a shared key. There are many methods available to share these keys, including pre-sharing keys and executing a key exchange. A pre-shared scenario requires that peers wishing to communicate must agree upon a key and exchange that key out-of-band before any secure communication is able to take place. In key exchange scenarios, peers are able to establish a shared secret key through the use of public key cryptography. An end-point uses its peer's public key to encrypt information that can only be decrypted by using the peer's secret key. Other key exchange mechanisms make use of long-term signing keys to verify the identity of the sender and the integrity of the message, and use this tamper-proof channel to exchange portions of a key negotiation resulting in a shared secret. This ability to exchange secret information over an insecure public channel provides easy and secure distribution capabilities. While this exchange of information is secure, the encryption protocols used are relatively inefficient, and should not be used for bulk encryption. For this reason, a key exchange is used to simply establish a common secret key that can then be used in a more efficient bulk encryption scheme. An example key exchange solution is the method through which Secure Socket Layer (SSL) and Transport Layer Security (TLS) establish a secure session. In SSL/TLS, two machines use some key exchange method (Diffie-Hellman, Rivest-Shamir-Adleman (RSA), Elliptic Curve Diffie-Hellman, or others) to establish a common secret key. This secret key is then used in some symmetric encryption scheme to encrypt all data exchanged between the machines. This technique permits the machines to establish a secure connection with no pre-shared information, and the key exchange solution that is used. In the preferred embodiment, the Elliptic Curve Diffie-Hellman key agreement is used (see, S. Blake-Wilson, N. Bolyaol, V. Gupta, C. Hawk, and B. Moeller, "Elliptic Curve Cryptograph (ECC) Cipher Suites for Transport Layer Security (TLS)," RFC 4492 (Informational), Internet Engineering Task Force, May 2006, updated by RFCs 5246, 7027).

A key component of any distributed system is the ability to locate peers and establish a shared session. For example, in the Domain Name System (DNS), a server's address is published within the system, and a computer requires only a Uniform Resource Locator (URL) in order to look the server up and find its address. DNS is a publicly accessible service with the ultimate goal of providing the widest dissemination of addresses. Some applications seek to minimize their visibility on the network in order to provide a level of secrecy or privacy. Applications that focus on security and privacy still require some means of locating peers, but must not rely on systems as widely accessible as DNS. This method of finding a peer without prior knowledge is called a blind rendezvous and becomes increasingly difficult as the number of possible locations grows, An additional feature that is desirable in distributed systems is the ability for hosts to roam across the network while remaining connected to the larger system. Roaming is defined as the ability for some machine on the Internet to establish connections from any subnet, while still maintaining the ability to locate a resource or be located when necessary. Roaming differs from network mobility in that network mobility supports a movement between networks while maintaining an active connection, where roaming requires that a host remains in single subnet for the duration of a session. In DNS, roaming and mobility become challenging due to the server and cache updates required to associate a hostname with a machine's IP address as it moves from network to network.

The method according to the present invention allows a machine to privately and securely share its location on the Internet without requiring direct contact with machines wishing to establish connections. As part of this solution, two machines must authenticate against each other to prevent third-party compromise of shared data. It is possible that location information could be shared between users in a secure environment before the users and their machines separate and connect to different parts of the Internet, although this sharing of static information brings with it several problems. Static distribution does not scale. If this information is to be shared with a large number of peers, the risk of compromise increases with each additional user. Since the information shared generally relates to network connectivity and includes an IP address, sharing this information statically also precludes the roaming that was discussed earlier. Another potential solution involves simply encrypting this information and sharing it on a publicly accessible single server. While this solution could work, it is vulnerable to a denial of service attack in which some adversary could prevent any of the machines from discovering connectivity information. Additionally, that single machine becomes a location that an adversary could target in an attempt to observe the connections from the machines that wish to remain hidden.

The blind rendezvous scheme according to the invention is a solution to these problems. This scheme permits private connection information sharing in a secure, authenticated, distributed, and dynamic manner. Strong cryptographic algorithms ensure security and authenticity, a DHT avoids the risk of a single point of failure, and forcing connection information to age out ensures only current information is available as machines move around the Internet, thus enabling roaming on the network.

One of the largest open distributed systems in use on today's Internet is the BitTorrent Distributed Hash Table (DHT), which is used for establishing connections between peers in the Peer-to-Peer (P2P) BitTorrent system. BitTorrent is a peer-to-peer protocol that is used for file sharing wherein users distribute the requisite bandwidth of the file transfer by uploading and downloading portions of a file to and from each other. Because of this design, a download with a large number of downloaders can be sustained without relying on the bandwidth of a single server.

The BitTorrent DHT protocol is based on the Kademlia DHT presented by Maymounkov and Maziès (see, P. Maymounkov and D. Maziès. "Kademlia: A peer-to-peer information system based on the xor metric," *Peer-to-Peer Systems*, Springer, 2002, pp. 53-65). Kademlia is a peer-to-peer DHT where node identities and data keys are both 160-bit opaque values. When a node wants to store a Key-Value pair in the DHT, they push the value to a node with an ID which is "close" to the data key based on an XOR metric. The Kademlia protocol allows nodes to efficiently learn about peers with addresses closer to the key at which they are attempting to store or retrieve data.

A preferred embodiment of the present invention makes use of the BitTorrent Mainline DHT as a mechanism for storing encrypted information. In 2014, the average daily number of DHT peers was on the order of 7.5 million distributed across the Internet in a large number of different geographical locations. The invention makes use of the immense size of this peer-to-peer network to provide resilience and suitable cover traffic to ensure the security, reliability, and privacy of the participants in the implemented protocol.

The BitTorrent protocol specifies several "DHT Queries" which nodes can use to walk through the Kademlia DHT and locate the peers currently downloading a specific torrent, and add themselves to the swarm so that other peers can locate them. The four queries currently specified and their use is given in Table 1.

TABLE 1

| Query | Description |
|---|---|
| ping | A simple ping/pong to establish if a node is still alive |
| find_node | Used to acquire the contact information (IP/port) for a node based on its node ID |
| get_peers | Used to retrieve information about peers in the swarm for a specific torrent |
| announce_peer | Used to add oneself to the list of peers in the swarm for a specific torrent |

The present invention leverages the size of the DHT to conduct a blind rendezvous between nodes. This blind rendezvous is defined to mean that two nodes have the ability to share some information without directly communicating with each other. Through the use of this approach, a small amount of information can be shared without directly communicating with each other. This small amount of information is exchanged through the DHT and requires only that peers have access to their peer's public key information. According to the preferred embodiment of the invention, an elliptic curve-based Diffie-Hellman key exchange and public key cryptography is used in order to describe a location within the DHT and further application of public key cryptography to generate a message to store at that location. Through this means, one node is able to securely store information that the other node can retrieve in the future.

The BitTorrent Mainline DHT is an implementation of the Kademlia DHT algorithm, and as such uses an opaque 160-bit address space for publishing and retrieving information. In normal operation, DHT descriptor or "infohash" is generated by taking the Secure Hash Algorithm 1 (SHA-1) hash of the value of the info key hash of the .torrent file. In contrast, the present invention utilizes a keyed hash of time construction where the key is generated using the Elliptic Curve Diffie-Hellman (ECDH) function. Specifically, the preferred embodiment of the invention utilizes the Curve25519 Diffie-Hellman function (see, D. J. Bernstein, "Curve25519: new diffie-hellman speed records," *Public Key Cryptography—PKC:* 2006 Springer, 2006, pp. 207-228).

There are two protocol parameters which need to be agreed upon prior to deployment:

H—A cryptographically strong hash function with a digest length of at least 160 bits (e.g., SHA256).

n—The length of the validity period for the descriptor.

The strength of the hash function is dependent on the computing powers of the devices utilizing the scheme versus the security requirements. Should an implementer find themselves in a situation where high security is required on a low power device, they would be required to make a decision as to balance the efficiency against the security of the protocol. Similarly, the length of n will vary based on the constraints of the devices and desire for increased security: a longer period requires fewer computation and network resources, but creates the a larger window of attack if an adversary is able to identify the node hosting the DHT message. In a high risk environment, the implementer may choose to decrease the length of n in order to force message aging more often.

For two users with public-private keypairs (X,x) and (Y,y), the shared moving target DHT descriptor d at any time t within the time window T of length n is generated as:

$$s = X \cdot y = Y \cdot x$$

$$T = t - (t \mod n)$$

$$d_T = H(s \| T)_{0 \to 159}$$

where $\|$ denotes concatenation and $\cdot$ denotes scalar multiplication over the elliptic curve Curve25519. This descriptor can be used to publish information which is boxed using the procedure described below. Both users can generate the same descriptor, i.e., the location within the DHT, and can therefore publish and retrieve information through the DHT under that value. Once time progresses into time period T+1, a new calculation will be required in order to store and retrieve information. It is required that some level of time synchronization be in place between peers in order to ensure that they move between time periods at nearly the same time. In one implementation, the Network Time Protocol (NTP) is used for time synchronization.

The BitTorrent Mainline DHT was designed to facilitate trackerless BitTorrent operation. Peers would utilize the infohash of the torrent they wished to download to locate other peers downloading that same torrent, and publish their IP address and port to allow other peers to locate them. This leads to a very Spartan design where the only data stored under the infohash descriptor is a list of IPs and 16-bit ports. Further, the handshake mechanism of retrieving a token value based on the IP address and a changing secret value makes it impossible or impractible to store data within the stored IP addresses. The invention provides a simple method of stuffing data into the port section of the contact info to allow for exchange of a limited amount of arbitrary information.

In order to send a B byte message, generate B unique random numbers over the interval [0,255] as an ordered list $\{p_0, p_1, \ldots p_B\}$. Then for each byte of the message $bit_1$ generate a 16-bit port as $(p_i \ll 8 | b_i)$. Send an announce peer message to the DHT under infohash d for the current time interval with that port. This allows the user to send up to 256-byte arbitrary messages to be stored in the DHT for some interval of time.

Users can use this to send arbitrary data of up to 256 bytes per IP address into the DHT. A user should ensure adequate security of the data should an eavesdropper discover the DHT descriptor by snooping on Internet traffic between unsecured nodes. Preferably, the user should make use of Bernstein's XSalsa20 stream cipher (see, D. J. Bernstein, "Extending the salsa20 nonce," *Workshop Record of Symmetric Key Encryption Workshop* 2011, 2011) and Poly1305 authenticator (see, D. J. Bernstein, "The poly1305-acs message-authentication code," Springer pp. 32-49, 2005) with keys generated from the Curve 25519 function for descriptor generation and a nonce based on the generated descriptor d which fulfills all requirements for XSalso20-Poly1305 nonces. This will result in an overhead of 16 bytes for the authenticator tag, leaving 240 bytes for the user's application.

Unlike the IPv6 Internet which uses a hierarchical addressing scheme where portions of the address are reserved for routing information, the DHT keyspace is flat. This changes the size of the keyspace from the size of the subnet ($2^{64}$) to the size of the entire address ($2^{160}$). This both improves the security margin by requiring the attacker to search a much larger address space and side-steps a difficult problem in the deployment of MT6D: locating the routing information of the other party.

H, the hashing function used to generate the descriptor based on a shared secret key and time, must be cryptographically secure in order to draw some conclusions about the DHT descriptors that it will generate. The Kademlia DHT used by BitTorrent defines the closeness of two nodes and the closeness of a node to an infohash by an XOR metric. The distance is calculated as: distance $(A, B) = |A \ominus B|$. The strong hash function should not permit any relation between outputs; on average each bit has a 50% probability of flipping between inputs, therefore it is expected that the average distance metric between any two descriptors should be 160/2=80. This ensures that consecutive descriptors are unlikely to be placed in the same DHT bucket, and are likely to be stored on very different nodes within the network. Ideally, messages from any two consecutive time intervals should be stored on different machines located using almost completely different lookup paths. The immense size and churn of the network provides an expectation that the protocol will make use of very different portions of the network. This expectation grows even stronger with the adoption of DHT Security Extensions, which prevents an attacker from executing an attack and becoming the DHT node where a message will be published or has been published.

This implementation requires that the server generates a different message for each client, even if each client should receive the same unencrypted message. This is due to the fact that the server uses the client's public key in order to encrypt the original message. The server generates the DHT key or descriptor, d. A shared secret is calculated using the scalar mult(q, n, p) function over the private key of the server and the public key of the client. This shared secret value is then concatenated with the current time window, T, which is then hashed to determine the DHT key for the current time window, $d_T$. The server publishes the key ($d_T$) and the encrypted message into the DHT.

The client requests the data from the DHT that the server put there for it. To do this, the client follows the same steps that the server took in reverse. First, the client generates $d_T$ by concatenating the shared secret between the client and the server (generated using the scalar mult(q, n, p) function over the client's private key and the server's public key) and the time of the current time-interval and hashing it. The client queries the DHT with $d_T$ to discover if there is a current time interval message from the server waiting. If such a message exists, the DHT returns the message to the client. If a message doesn't exist and the keys have been used correctly, it is likely that the message has expired and been aged out of the DHT. If a message was returned from the DHT, the client decrypts the retrieved cyphertext in order to extract the contents of the message. At this point, the client can use the contents of the message to execute some further task, whether that be beginning the establishment of a moving target defense connection or establishing a connection to some hidden service.

The invention brings together the address changing techniques of MT6D and the blind rendezvous scheme. It is through the combination of these technologies that a network-based moving target defense system gains the capability to dynamically and securely exchange configuration information. Exchanging configuration information through a blind rendezvous technique enables a roaming capability, an ability to scale, and a dynamism that is not available in any current moving target defense system and reduces the amount of pre-shared information to only a public key. This new scheme relies on the size, resilience, and anonymous nature of the BitTorrent Distributed Hash Table to improve security, privacy, and anonymity.

Establishing an MT6D session requires that each endpoint has the necessary configuration information. Addresses are calculated by hashing a host's Extended Unique Identifier-64 (EUI-64) Interface Identifier (IID), a shared session key, and a timestamp. The values are concatenated and hashed using the form:

$$IID'_{x(t_i)} = H[IID_x \| K_S \| t_i]_{0 \to 63}$$

where $IID'_{x(t_i)}$ represents the MT6D IID for host x at time $t_i$, $IID_x$ represents the EUI-64 or statically defined IID from host x, $K_S$ represents a shared session key, and $t_i$ represents the time at instance i. $\|$ denotes concatenation, and H is some cryptographically strong hashing algorithm with a result longer than 64 bits, such as SHA256. The first 64 bits of the hash are then concatenated with the 64-bit network address of host x, resulting in a complete 128-bit MT6D generated address.

While the original implementation of MT6D required a manual exchange of configuration information and the generation of a static configuration file to hold the information, the present invention adds the ability to dynamically generate this configuration information and share it over the network in a private but authenticated manner. The move towards dynamically generated and automatically distributed configurations helps to overcome limiting factors inherent in the initial design of MT6D. The modifications to MT6D include a move from a statically defined symmetric key to a randomly generated key that changes at some pre-determined interval. Changing the symmetric key ensures that a captured key is only valid for a short period of time, thus limiting exposure in the case of a compromise It is the server's responsibility to ensure that configuration data is updated and published to the DHT on a periodic basis. This time period should be based on the specific situation in which MT6D is being implemented. In an environment where there is greater risk to compromise or attack, the scheme should be tuned to rotate configuration information more often. This time period, T, is defined as the beginning of the time window during which a specific configuration will be valid. T is of some pre-configured length n. In order to ensure configuration synchronization between hosts, T is calculated using (now−(now mod n)). This use of modulo arithmetic in combination with time forces time windows to begin on regular intervals, thus ensuring T is the same between hosts. Using T as a component within the DHT descriptor also forces the configuration messages to expire periodically.

Publishing information according to the DHT-based blind rendezvous scheme requires that the server generates a descriptor for time period T, $d_T$, and a message m. $d_T$ is calculated by the server using the following equation:

$$d_T = H(S_{pri} \cdot C^i_{pub}) \| T)_{0 \to 159}$$

where H is a strong hashing algorithm such as SHA256, $S_{pri}$ is the server's private key, $C^i_{pub}$ is the public key for client $C^i$, and T defines the time period. The server then generates the message, m, by using the following equation:

$$m = \text{Nonce} \| MAC \| E_{C^i_{pub}}(E_{S_{pri}}(E_{Nonce}(SeedIPv6_S \| K \| Rot)))$$

where $SeedIPv6_S$ is an IPv6 address which is the concatenation of the server's IPv6 subnet and a randomly generated IID. K is the MT6D symmetric key, Rot is the address rotation period, and Nonce and MAC are generated by the encryption algorithms to prevent replay attacks. Notice also that in the generation of the message, the scheme encrypts the configuration data with both the server's private key as a digital signature and the client's public key to ensure that only the client can decrypt the message. The server then publishes message m using descriptor $d_T$ into the DHT for future retrieval by the client.

The original design of MT6D relied on the idea that both endpoints have knowledge of their peer's EUI-64 calculated IID, subnet, pre-shared key, and MT6D rotation time interval. The goal of this invention is to improve the protocol by requiring that as little data as possible be known by each endpoint prior to connection. By applying the DHT blind rendezvous scheme to MT6D, no specific network data is required be known by either endpoint prior to connection. The blind rendezvous scheme reduces the shared information requirement so that only public keys need be shared between endpoints. Since the server no longer needs prior knowledge of the client's EUI-64 IID or subnet, and in fact could not know the specific subnet from which the client would connect, the scheme cannot use the same methods applied in the original design of MT6D. Instead, it must use some values for client subnet and IID that can be known to all parties. This problem is solved by the generation of the descriptor. The client's seed IID is generated as shown in the following equation:

$$C_{IID} = H((S_{pri} \cdot C_{pub})\|K)_{0-63} = H((S_{pub} \cdot C_{pri})\|K)_{0 \to 63}$$

where $(S_{pub}, S_{pri})$ is the public/private key pair of the server, $(C_{pub}, C_{pri})$ is the public/private key pair of the server, and K is a key that has been pseudo-randomly generated by the server and was retrieved by the client from the DHT. Using this method to generate the seed IID ensures that both endpoints of the conversation use the same seed information when calculating MT6D addresses, but ensures that each of the clients uses a different seed and thus create differing IPv6 addresses.

The client obtains configuration information from the DHT by querying for the descriptor that is calculated with $H(S_{pub} \cdot C^i_{pri}\|T)_{0 \to 159}$, which is the inverse of the server generated descriptor, but based on the properties of Elliptic Curve Diffie-Hellman (ECDH) results in the same value. Upon receipt of message m, the client decrypts and validates the message using its private key and the server's public key, and the nonce provided by that descriptor. As long as there is a message somewhere in the DHT that is defined by that descriptor, the client will retrieve it. In the case that the client requests a descriptor on the boundary between two different T windows, it may fail to find the current descriptor or will retrieve expired data. Once it decrypts the data and discovers that it is expired, it simply searches for a descriptor with the new T value. T should be measured in minutes or hours, so the cost of less than a second to query, retrieve, and decrypt an expired message then re-query, retrieve, and decrypt the current time period's message is minimally impactful. Once decrypted, the retrieved message contains all of the configuration information required to calculate its own MT6D addresses, namely the key (K), the rotation period (Rot), and the server's seed IID (SeedIPv6$_S$). Additionally, the client calculates its own MT6D seed IID with the server's public key and its own private key.

In an effort to maintain a level of separation between the clients that may connect to a common server, separate MT6D connections are established between each client and the server. This is as an alternative to having the server maintain a single MT6D instance that is connected to by all possible clients. Building the system so that clients all connect to a single MT6D instance simplifies many of the session establishment requirements, but reduces the level of anonymity and privacy that each client enjoys. Maintaining separate MT6D instances for each client, helps to ensure that the clients are not able to discover each other on the network by simply listening to network traffic. In order to successfully maintain separate connections, the server is required to conduct separate MT6D address calculations for each client connection and bind those addresses to virtual interfaces that are instantiated upon client request. The establishment of these separate connections requires some common means of finding the server on the network, which is accomplished by maintaining what is referred to as an introduction interface on the server and publishing the requisite information into the DHT. The introduction interface is maintained by the server's main MT6D process and is monitored for connection requests coming from clients. Upon receiving a connection request, the server spins up a new MT6D virtual interface that will only exist for the duration of the session with the given client and is only used for communication with that client. The invention relies heavily on public key infrastructure as a means to encrypt and authenticate all of the scheme's messages. Any session establishment message, including those published to the DHT, are both signed by the originator's private key and encrypted using the intended recipient's public key. The combination of these keys provides an additional layer of protection from man in the middle and replay attacks.

When the server starts, a number of steps are required to get it to a steady-state where it is prepared to accept connections from clients. Because there are multiple event triggers that must be monitored, the server uses an event loop library for the maintenance of event timers, traffic watchers, and signal watchers. Since the server could end up binding a large number of IPv6 addresses to the physical Ethernet interface, it registers a SIGINT watcher that ensures that it can exit gracefully and remove all of the bound addresses. See Algorithm 1 below. With the signal watcher in place, the server creates the introduction tunnel interface, which is used for all session establishment communication. The server assigns this interface a self-generated IPv6 address that is a concatenation of the 64-bit IPv6 subnet, which was retrieved from the Ethernet interface, and 64 randomly generated bits. The server's self-assigned address is referred to as SeedIPv6$_S$. This address will be the destination address of all configuration request messages coming from any of the clients as they traverse the MT6D established tunnels. The server also generates a 128-bit introduction session key, which is used in combination with the tunnel interface IID for MT6D address generation calculations. With these pieces in place, the server starts two timers and two watchers. The first timer is used for address changes according to the MT6D algorithm and defaults to three seconds. At each timer expiration, the server generates a new MT6D address for the time period and binds it to the Ethernet interface. The second timer is used for the rotation of introduction session configuration information. The server also generates two input/output watchers that look for MT6D data inbound from or outbound to the network. The outbound tunnel interface watcher ensures that traffic that is destined for an MT6D host is encapsulated in a UDP header with the current MT6D generated ports. The datagram is then encapsulated into an IPv6 header with the current time period's MT6D generated source and destination IPv6 addresses. The server uses the inbound UDP traffic watcher to catch any UDP traffic that is inbound from an MT6D host and arriving addressed to an MT6D IPv6 address and current MT6D UDP port. This traffic is then routed through the MT6D process in order to decapsulate the IPv6 packet which is then passed to the traditional network stack for processing.

Algorithm 1 Server Start-up Algorithm

1: Start SIGINT watcher
2: Create introduction interface (mt6d0)
3: Generate and bind tunnel interface IP
4: Start address rotation timer
5: Start configuration publication timer
6: Start outbound tunnel interface watcher
7: Start inbound UDP traffic watcher Once the server has completed its startup procedures and is in its steady state, it forces an expiration of the configuration publication timer, which triggers the steps presented below as Algorithm 2.

As described above, the server generates an introduction session key during start-up that is applied to the MT6D address calculations in the main MT6D process. Periodically, the server re-generates this session key in order to ensure that only current clients are able to discover configuration information within the DHT. This period is described as the introduction session configuration period, and is monitored by the configuration publication timer. At each timer trigger, which is fifteen minutes by default, the server executes the steps described in Algorithm 2, shown below. Simply put, the server generates a new introduction session key and publishes a new message into the DHT for each of the registered clients to retrieve. Separate messages are used for each of the potential clients so that the strength of public key encryption may be leveraged to ensure that only authorized clients are able to retrieve and decrypt messages. Since each of these messages is both signed and encrypted, clients can be certain that messages retrieved from the DHT are for them and are definitely from the server. A server must have prior knowledge of all potential clients that may want to connect to it, which is referred to as registering with the server. This registration is simply the act of providing the server some identifying information that allows it to procure the client's public key. In the proof of concept implementation, the server maintains a copy of each client's public key in a text-based key store, but in reality would be some publicly accessible public key infrastructure.

Algorithm 2 Configuration Publication Algorithm

1: for each configuration time period (T) do
2:    Generate introduction key (K)
3:    Build/Reconfigure introduction interface
4:    for each registered client ($C^i$) do
5:      Calculate the descriptor:
       $d_T = H(S_{pri} \cdot C^i_{pub} \| T)_{0-159}$
6:      Randomly generate a message nonce (N)
7:      Calculate the message:

$$m = \text{Nonce} \| \text{MAC} \| E_{C^i_{pub}}(E_{S_{pri}}(E_{Nonce}(\text{SeedIPv6}_S \| K \| \text{Rot})))$$

8:      Publish m at $d_T$ in DHT
9:    end for
10: end for

In order to fully support the establishment of dynamic MT6D sessions, development of a session establishment protocol is required. The protocol is a layer 4 messaging protocol that uses an IPv6 next header value of 0x254, which defines experimental protocols. By using a next header value of 0x254, the machines are able to easily differentiate traffic on the endpoints as it is received. Currently, only three possible message types are defined as part of the session establishment protocol. Message ID 0 is a configuration request message, message ID 1 is a configuration response message, and message ID 2 is a session teardown message. Each message begins with the 8-bit value that is its identification, and is followed by any other data pertinent to that message.

The configuration request message is identified as message ID 0, and is sent by the client to request a session configuration from the server, and thus is the message that begins the entire process of session establishment. Not only does it begin the session establishment process, but it gives the client an opportunity to tell the server where it is located on the Internet, which client it is, and what seed IID it will use to calculate MT6D addresses. As can be seen below, the configuration request message is a 36-byte message that consists of an 8-bit message ID, a 24-bit client ID, and two 128-bit IPv6 addresses.

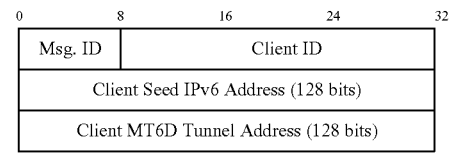

The Configuration Request Message (MSG ID 0)

The first address identifies the seed address that the client will use in the calculation of MT6D addresses and the second defines the tunnel address that the client will use in order to route traffic into the MT6D process.

The configuration response message, identified as message ID 1, is sent by the server in response to a configuration request message. The response message is a 36-byte message that consists of an 8-bit message ID, a 24-bit address rotation period, a 128-bit tunnel IP address, and a 128-bit session key. As with the client's configuration request message, the server maintains a tunnel address which is given to the client to ensure MT6D traffic is routed through the MT6D tunnel.

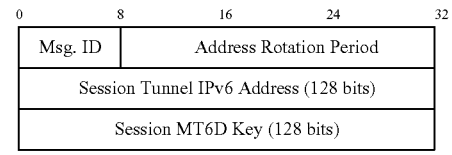

The Configuration Request Message (MSG ID 1)

The final message that is currently defined is identified as message ID 2, and is best described as a session teardown message. This is the message that is sent by either the client or the server when it is ready to tear down the current session. This message is not necessary because of timeouts that are integrated into both the client and the server, but sending it helps to close sessions more quickly rather than waiting for timers to expire. Use of this message not only helps to save network resources, but also saves computation resources on the communicating peers by halting MT6D address calculations earlier.

Figure 3:
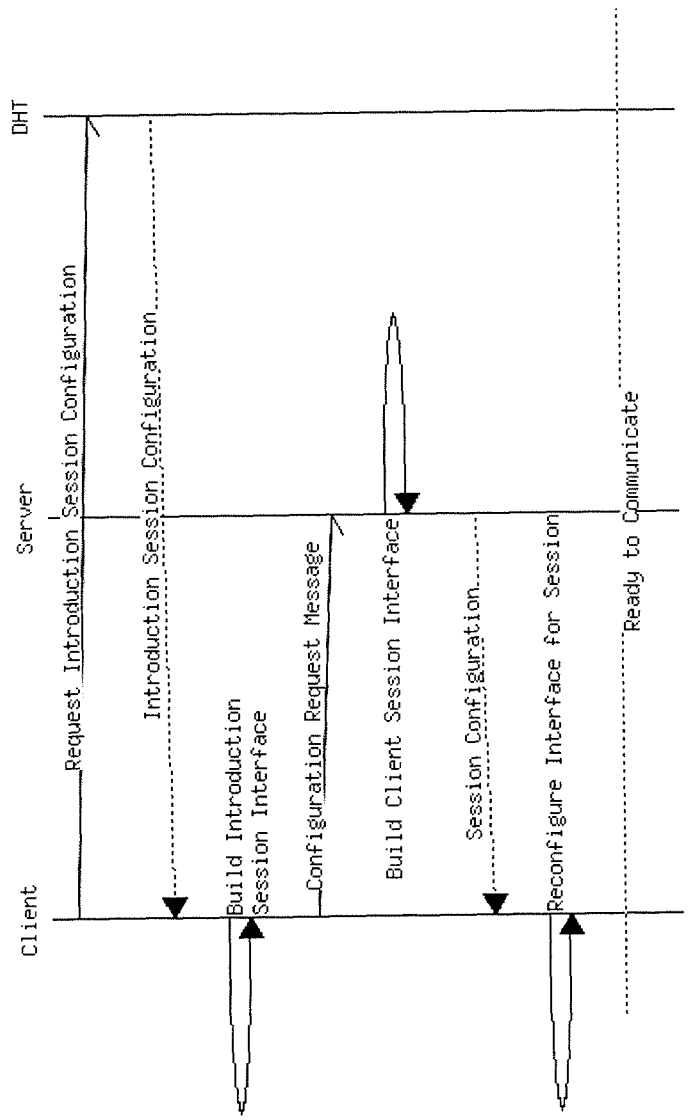
FIG. 3 is the session establishment message sequence chart in a moving target defense system for client/server systems according to the present invention.

In an effort to more clearly describe the processes required for a client to establish a connection with an MT6D server, a message sequence chart is presented as FIG. 3. Prior to the first message in the chart being sent by the client, the server has completed its startup procedures and is now in its steady state, listening on its introduction interface for configuration request messages from its registered clients.

When the client is prepared to request a session from the server, it begins by querying the DHT for introduction configuration information. The client generates a descriptor. Based on the properties of Elliptic Curve Diffie-Hellman, the scheme generates the same shared secret that the server was able to generate by using the client's private key and the server's public key as shown in the following equation:

$$d_T = H(S_{pri} \cdot C^i_{pub} \| T)_{0 \to 159}$$

This shared secret is the descriptor that describes the location with the DHT at which the server published a message containing introduction session configuration information for the client. Once the client receives the introduction session configuration message from the DHT, it has sufficient information to locate the MT6D server on the Internet and begin communication with it.

As shown in FIG. 3, the client's next step is to use the introduction session configuration information in order to instantiate an introduction session interface and begin calculating MT6D addresses for both itself and the server. It then crafts a configuration request message. The message is wrapped into a standard IPv6 header that is addressed to the server's introduction interface tunnel address which gets routed through the MT6D process where a UDP header and MT6D addressed IPv6 header are added on.

Upon receipt, the server builds a client session interface by instantiating a new tunnel interface, forking a child process that manages the MT6D address calculations for that session interface, and activating an event loop that monitors the interface for any inbound messages. The child process generates a new session key that is used in the calculation of MT6D addresses for the session and generates a new tunnel interface IPv6 address by concatenating the IPv6 subnet with a randomly generated 64-bit IID. This new address is bound to the session's tunnel interface, which will only be used for communication with a single client for the duration of the session with that client. Once the tunnel interface has been created, an address assigned, and MT6D addresses have begun to be bound to the physical interface, a configuration response message is built and returned to the client. Upon receipt of the configuration response message, the client changes its MT6D session key and modifies its routing tables, ensuring locally originating MT6D traffic is routed into the tunnel that is destined for the server's session interface. The client does not require instantiation of a new MT6D tunnel interface, as the simple modification of the session key is sufficient to begin calculating session MT6D addresses, thus transforming the client's introduction interface into a session interface The scheme requires only that the server has access to the ECDH generated public key for any of the potential clients that may wish to connect to it. Clients then use their private key and the server's public key in order to collect key configuration information from DHT where the server had stored it earlier. Maintaining this layer of separation between clients and server provides benefits that include an inability to link the client and server based on standard network communication, which provides a level of anonymity that is not provided by traditional network services.

Once public keys have been obtained, the scheme provides a means for a client to determine the configuration information required to connect to the server by finding a message that has been left in the DHT by the server. The use of the DHT gives the server the benefit of both network mobility and the ability to modify configuration information periodically. By requiring that the server maintain only a single introduction interface, the amount of computing power required by the server and its network footprint are also reduced. In steady-state, the server maintains only a single set of three MT6D addresses and a single introduction tunnel interface.

Finally, the session establishment protocol is the first time that the server learns of the network location of the client who wishes to establish a connection. Because the server does not maintain any private information about the clients, a compromise of the server's data does not gain an attacker any of the clients' private information. Additionally, the dynamic configuration establishment provides a means through which clients can establish a session from any subnet rather than only those which had been pre-determined. This feature provides a sense of network roaming that is not present in any previous design of MT6D. The only current requirement is that a client remain in the same subnet for the duration of the current session, although with the addition of dynamic re-configuration, a client could potentially begin the reconfiguration process as it transitions from one subnet to another.

Figure 4:
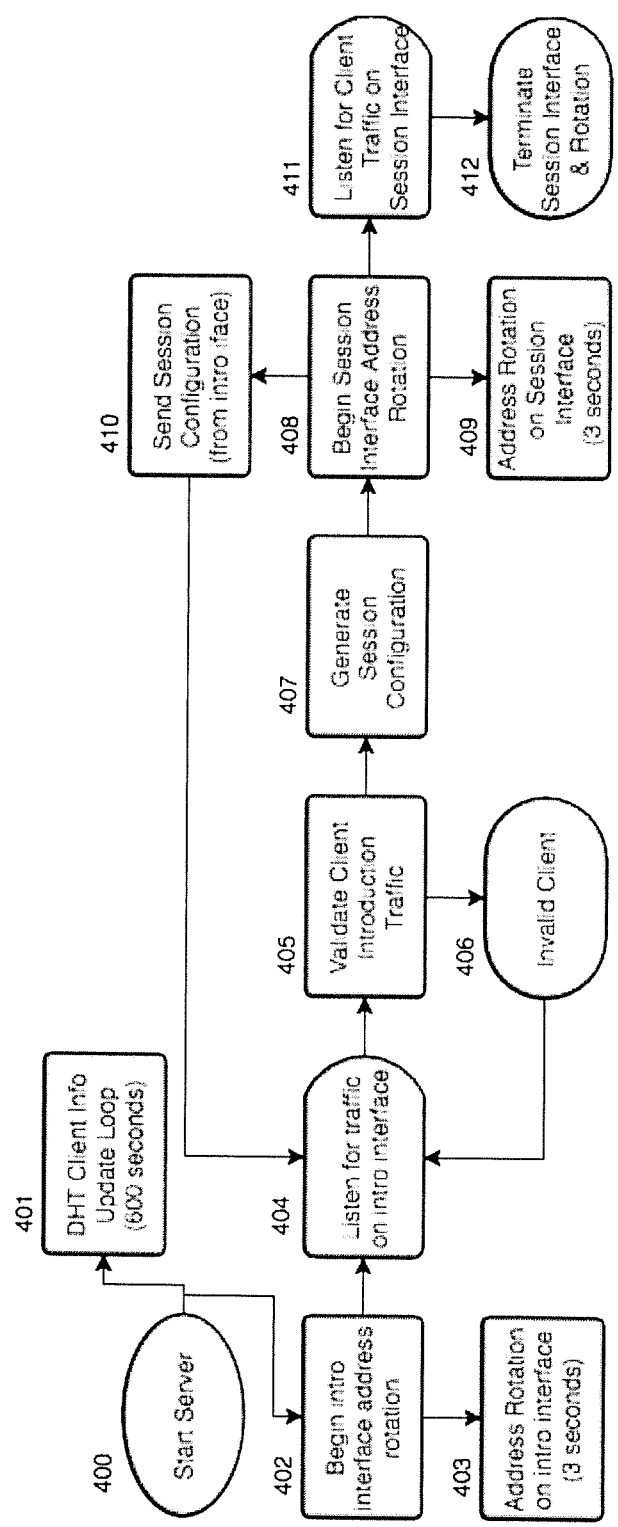
FIG. 4 is a flow chart showing the process of the server according to the invention.
Figure 5:
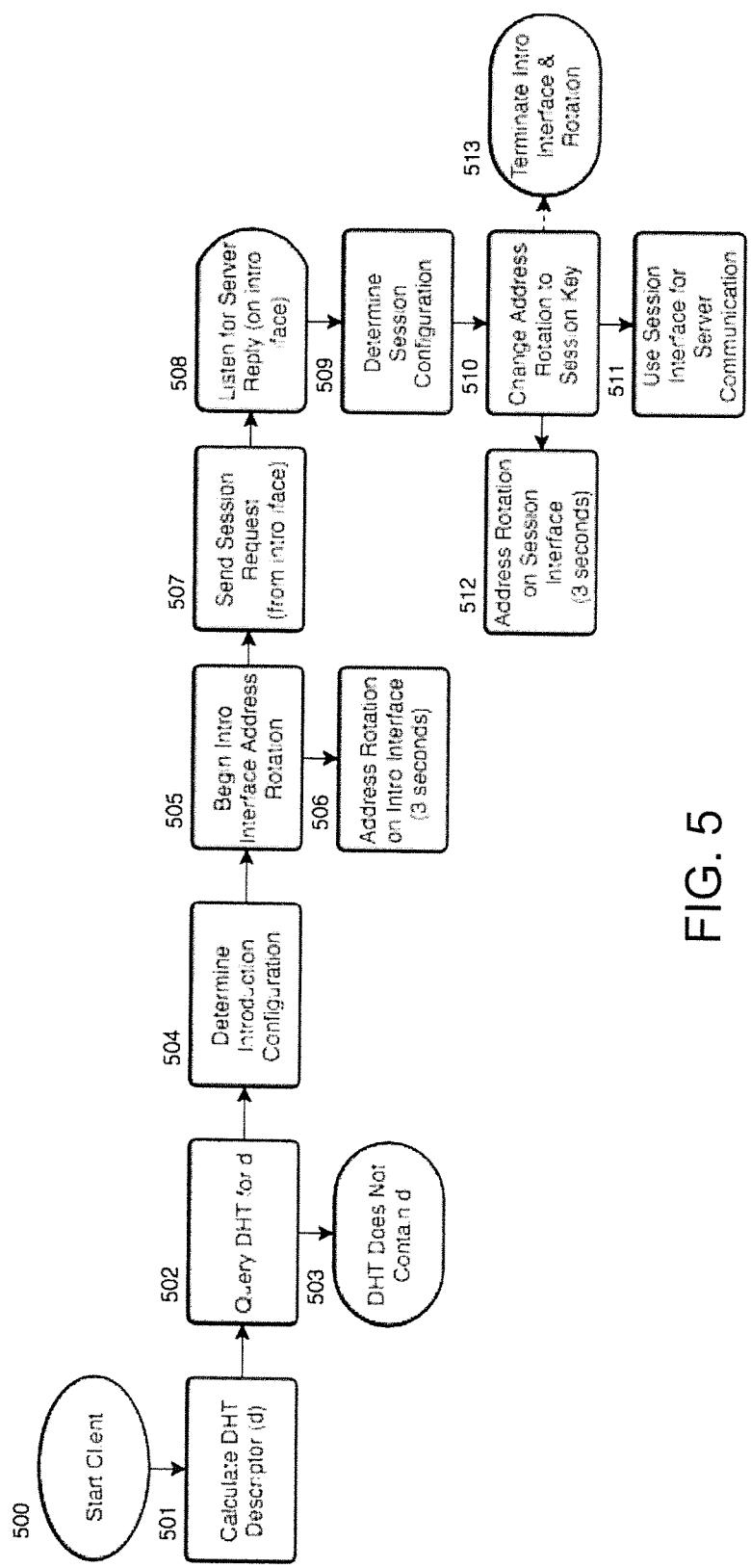
FIG. 5 is a flow chart showing the process of a client according to the invention.

FIGS. 4 and 5 summarize the server and client processes. Considering first the server process shown in the flow diagram of FIG. 4, the process begins at 400 with the start of the server. It is the server's responsibility to update client information in the DHT at 401. The server also begins introduction interface address rotation at 402. Address rotation on introduction interface is, in a preferred embodiment, every three seconds at 403. The server then listens for traffic on the introduction interface at 404. When client traffic is received, the client introduction is validated at 405. If the client is not validated at 406, the process returns to process block 404 where the server continues to listen for traffic. Should the client be validated, the server generates a session configuration at 407. Once the session configuration has been generated, the server begins session interface address rotation at 408. In the preferred embodiment, the address rotation on the session interface is every three seconds at 409. Once the session interface address rotation has begun at 408, the server sends session configuration to the client at 410 and continues to listen for traffic at 404. During the session, the server listens for client traffic on the session interface at 411. When the session ends, the server terminates the session interface and address rotation at 412.

Next, considering the client process shown in the flow diagram of FIG. 5, the process starts at 500. The client begins the session by calculating the DHT descriptor d at 501. Next, the client queries the DHT for d at 502. If the DHT does not contain the calculated descriptor d, the process ends at 503. Assuming that the descriptor d is found in the DHT, the next step in the process is to determine the introduction configuration at 504. Then, the introduction interface address rotation is begun at 505. Again, in the preferred embodiment, the address rotation on the introduction interface is every three seconds at 506. The client then sends a session request to the server from the introduction interface at 507. In process block 508, the client listens for the server reply on the introduction interface. Upon response from the server, the client determines the session configuration at 509, and the session interface address rotation is begun at 510. Again, in the preferred embodiment, the address rotation on the session interface is three seconds in 512. The session interface is used for server communication at 513. Once the session is established, the introduction interface is no longer required and is terminated.

Figure 6:
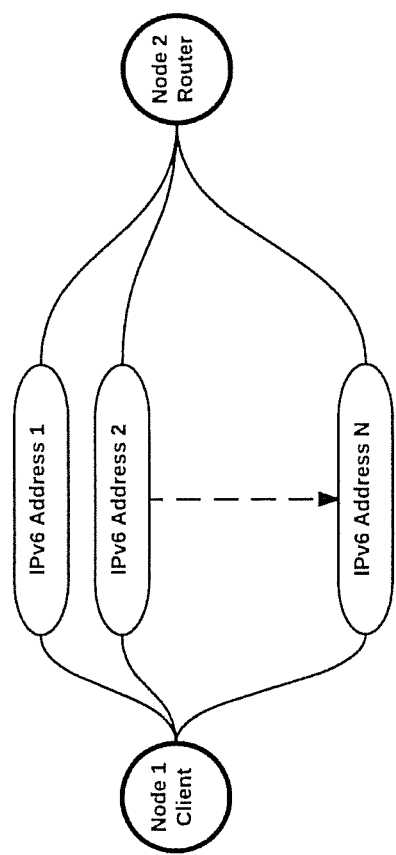
FIG. 6 is a representation of a standard network setup to study Neighbor Discovery Protocol (NDP)

A simulation was scripted in the ns-3 environment to attempt to bind n addresses to the client node, where n is one of 100, 500, 1000, 2000, 4000, 8000, 16000, 32000, or 48000. ns-3 automatically assigned IPv6 addresses to the interface through the use of the IPv6Address, IPv6AddressGenerator, and IPv6AddressHelper classes. FIG. 6 provides a visual representation of the network setup used in the simulation after all addresses are bound. Upon initialization, the router and the client each have only a link local and IPv6 address assigned to them. The two nodes exchange their initial neighbor discovery messages, such as router advertisements and neighbor solicitations immediately after address assignments.

At 100 seconds of simulation time, ns-3 strips the client device of its IPv6 address and begins to bind new and unique IPv6 addresses. New address binding is delayed by 100 seconds to ensure that all initialization of the subnet is complete and the network is stable. Because this study focuses on the impact on NDP of binding a large number of addresses, the address used does not matter, so incrementation is used for address generation rather than fully implementing the MT6D address generation scheme. Additionally, by incrementing addresses rather than calculating them, address collision avoidance is guaranteed.

After binding addresses, the client node sends a neighbor solicitation message for each address bound. After the message is transmitted, the router receives and handles them according to ns-3 functions implemented in the ICMPv6L4Protocol class. The total time required to send all NS messages is then recorded after the successful receipt of the final NDP message. To also measure the influence of bandwidth on this problem, each varying value of n is simulated with connection speeds of 10 Mbps, 100 Mbps, 1 Gbps, 10 Gbps, and 100 Gbps.

Table 2 shows the results for 16000 and 32000 addresses. The simulation demonstrates that at speeds of 100 Mbps, 1 Gbps, 10 Gbps, and 100 Gbps address bindings occur within 0.5% of each other when binding the same number of addresses. On a network of 10 Mbps, the results show that there is very little impact to time. This same trend was also observed in all other simulations with different numbers of addresses. The difference in binding time between the varying connection speeds remained proportionally the same.

TABLE 2

| Bandwidth | 16000 Addresses (Seconds) | 32000 Addresses (Seconds) |
|---|---|---|
| 10 Mbps | 38.406 | 76.883 |
| 100 Mbps | 37.384 | 74.799 |
| 1 Gbps | 37.266 | 74.546 |
| 10 Gbps | 37.255 | 74.54 |
| 100 Gbps | 37.253 | 74.538 |

Figure 7:
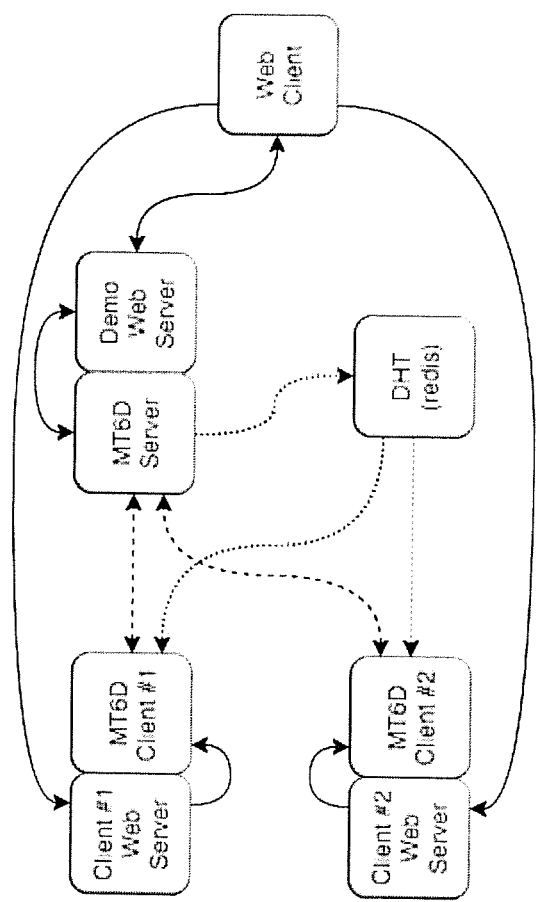
FIG. 7 is a system architecture diagram of an MT6D server demonstration.

FIG. 7 provides a visual diagram to more easily understand the architecture of the demonstration system. Dotted lines denote DHT configuration exchange communication paths. Note that the configuration is generated on the MT6D server, pushed into the DHT, and retrieved from the DHT by the MT6D clients. Dashed lines denote MT6D session establishment and MT6D communication paths. With configurations retrieved from the DHT, the clients have the ability to establish sessions directly with the MT6D server. Solid lines denote web traffic. All demonstration triggers are sent from the web client to either the demonstration web server or one of the client web servers. Upon receipt, web servers use shelljs to execute MT6D on their hardware. The version of MT6D that is running on the MT6D server has been customized to send data to the primary web server via http POST. This data includes address calculations and the status of ongoing connections with each of its respective clients. The data is then relayed to the web client through a web socket in the form of small JSON objects. The web client is then able to display the data in a way that is meaningful to the user.

While the invention has been described in terms of a single preferred embodiment, those skilled in the art will recognize that the invention can be practiced with modification within the spirit and scope of the appended claims.

The invention claimed is:

1. A secure communication network, comprising:
at least one server connected to the network and accessing a Distributed Hash Table (DHT), the server having a private and public cryptographic key pair ($S_{pri}$, $S_{pub}$);
a plurality of clients connected to the network and in communication with the server, each client having a unique private and public cryptographic key pair ($C_{pri}$, $C_{pub}$);
the server and a communicating client implementing a randomly generated key that changes at some predetermined interval, the server publishing a descriptor $d_T$ calculated using the server's private key $S_{pri}$ and the client's public key $C_{pub}$ and storing the descriptor $d_T$ in the DHT, and the client querying for the descriptor $d_T$ stored in the DHT to obtain configuration information;
wherein when the server publishes to the DHT, the server generates a descriptor for time period T, $d_T$, and a message m, where $d_T$ is calculated by the server using the following equation: $d_T = H(S_{pri} \cdot C_{pub}^i \| T)_{0 \to 159}$
where H is a strong hashing algorithm, $S_{pri}$ is the server's private key, $C_{pub}^i$ is the public key for client $C^i$, and T defines the time period, and the message, m, is calculated by using the following equation:

$$m = \text{Nonce} \| MAC \| E_{C_{pub}^i}\left(E_{S_{pri}^i}(SeedIPv6_S \| K \| Rot)\right)$$

where $SeedIPv6_S$ is an Internet Protocol version 6 (IPv6) address which is the concatenation of the server's IPv6 subnet and a randomly generated seed Interface Identifier (IID), K is a symmetric key, Rot is an address rotation period, and Nonce and MAC are generated by encryption algorithms; and
wherein the time period, T, is used as a component within the DHT descriptor and is varied in duration to provide the capability to dynamically and securely exchange configuration information depending on a detected environment.

2. The secure communication network of claim 1, wherein the server stores arbitrary piece of data in the DHT that is retrieved by a client, the server generates a DHT key or descriptor $d_T$ and calculates a shared secret using a function over the private key $S_{pri}$ of the server and the public key $C_{pub}$ of the client, and when a client requests data from the DHT, the client generates $d_T$ by concatenating the shared secret between the client and the server generated using a function over the client's private key $C_{pri}$ and the server's public key $S_{pub}$.

3. The secure communications network of claim 1, wherein a client's seed Interface Identifier (IID) is generated as shown in the following equation:

$C_{IID} = H((S_{pri} \cdot C_{pub}) \| K)_{0 \to 63} = H((S_{pub} \cdot C_{pri}) \| K)_{0 \to 63}$ where H is a strong hashing function and K is a key that has been pseudo-randomly generated by the server and was retrieved by the client from the DHT, the retrieved message containing all of the configuration information required to calculate the client's own addresses, namely the key (K), the rotation period (Rot), and a server's seed IID, and the client calculates its own seed IID with the server's public key and its own private key.

4. The secure communication network of claim 1, wherein the server generates a different message for each client, even if each client should receive the same unencrypted message, due to the fact that the server uses the client's public key in order to encrypt an original message.

5. The secure communication network of claim 1, wherein the DHT is the BitTorrent Distributed Hash Table.

6. The secure communication network of claim 1, wherein the encryption algorithm used is the Elliptic Curve Diffie-Hellman (ECDH) algorithm.

7. A method of providing secure communication over a network, comprising the steps of:
connecting at least one server to the network, the server accessing a Distributed Hash Table (DHT) and having a private and public cryptographic key pair ($S_{pri}$, $S_{pub}$);
connecting a plurality of clients to the network so as to be in communication with the server, each client having a unique private and public cryptographic key pair ($C_{pri}$, $C_{pub}$);
implementing by the server and a communicating client a randomly generated key that changes at some predetermined interval;
publishing by the server a descriptor $d_T$ calculated using the server's private key $S_{pri}$ and the client's public key $C_{pub}$;
storing by the server the descriptor $d_T$ in the DHT, and querying by the client for the descriptor $d_T$ stored in the DHT to obtain configuration information;
the step of publishing by the server to the DHT, the step of publishing including the steps of:
generating by the server a descriptor for time period T, $d_T$, and a message m, where $d_T$ is calculated by the server using the following equation:

$$d_T = H(S_{pri} \cdot C_{pub}^i \| T)_{0 \to 159}$$

where H is a strong hashing algorithm, $S_{pri}$ is the server's private key, $C_{pub}^i$ is the public key for client $C^i$, and T defines the time period, and
generating by the server the message, m, is calculated by calculating equation:

$$m = \text{Nonce} \| MAC \| E_{C_{pub}^i}\left(E_{S_{pri}^i}(E_{Nonce}(SeedIPv6_S \| K \| Rot))\right)$$

where $SeedIPv6_S$ is an Internet Protocol version 6 (IPv6) address which is the concatenation of the server's IPv6 subnet and a randomly generated seed Interface Identifier (IID), K is a symmetric key, Rot is an address rotation period, and Nonce and MAC are generated by encryption algorithms; and
wherein the time period, T, is used as a component within the DHT descriptor and is varied in duration to provide the capability to dynamically and securely exchange configuration information depending on a detected risk environment.

8. The method of providing secure communication over a network of claim 7 further comprising the steps of:
storing by the server stores arbitrary piece of data in the DHT that is then retrieved by a client;
generating by the server a DHT key or descriptor $d_T$;
calculating by the server a shared secret using a function over the private key $S_{pri}$ of the server and the public key $C_{pub}$ of the client; and
when a client requests data from the DHT, generating by the client $d_T$ by concatenating the shared secret between the client and the server generated using a function over the client's private key $C_{pri}$ and the server's public key $S_{pub}$.

9. The method of providing secure communications over a network of claim 7, further comprising the step of generating a client's seed Interface Identifier (IID) by calculating the following equation:

$$C_{IID} = H((S_{pri} \cdot C_{pub}) \| K)_{0 \to 63} = H((S_{pub} \cdot C_{pri}) \| K)_{0 \to 63}$$

where H is a strong hashing function and K is a key that has been pseudo-randomly generated by the server and was retrieved by the client from the DHT, the retrieved message containing all of the configuration information required to calculate the client's own addresses, namely the key (K), the rotation period (Rot), and a server's seed IID, and the client calculates its own seed IID with the server's public key and its own private key.

10. The method of providing secure communications over a network of claim 7, further comprising the step of generating by the server a different message for each client, even if each client should receive the same unencrypted message, due to the fact that the server uses the client's public key in order to encrypt an original message.

11. The method of providing secure communications over a network of claim 7, wherein the DHT is the BitTorrent Distributed Hash Table.

12. The method of providing secure communications over a network of claim 7, wherein the encryption algorithm used is the Elliptic Curve Diffie-Hellman (ECDH) algorithm.

* * * * *